July 3, 1945.　　　R. G. LE TOURNEAU　　　2,379,583
LATHE TOOL MOUNTING AND ACTUATING MECHANISM
Filed Feb. 20, 1943　　　3 Sheets-Sheet 3

Inventor
R.G.LeTourneau
By
Webster & Webster
Attorneys

Patented July 3, 1945

2,379,583

UNITED STATES PATENT OFFICE 2,379,583

LATHE TOOL MOUNTING AND ACTUATING MECHANISM

Robert G. Le Tourneau, Peoria, Ill., assignor to R. G. Le Tourneau, Inc., Stockton, Calif., a corporation of California Application February 20, 1943, Serial No. 476,541

5 Claims. (Cl. 29—47)

This invention relates in general to an improved lathe tool mounting and actuating mechanism therefor.

In particular the invention is directed to, and it is one of the objects to provide, a tool mounting movably secured on a lathe in such manner that upon movement of a separate tool to a predetermined working position relative to the work, said tool mounting is automatically actuated to bring its tool into working position on another part of the work, whereby to produce different but simultaneous cuts on the work so that the operator need control only the movement of said separate tool.

Another object of this invention is to provide a lathe tool mounting and actuating mechanism assembly which includes a tool holder mounted on the lathe for movement to swing a supported tool from a position clear of the work to a position in cutting engagement therewith, and means to effect such movement of the tool holder; the lathe including a tool supporting carriage separate from said tool holder, and said carriage—upon predetermined movement in one direction—being operative to engage and actuate said means.

A further object of this invention is to provide in combination in a lathe which includes a longitudinally movable tool supporting carriage; a tool holder mounted in connection with the bed of the lathe for swinging movement transversely of the lathe axis whereby to move the tool toward and away from the work, and actuating means connected with said tool holder, said actuating means including a movable element disposed in the path of forward movement of the carriage, said element being adapted to be engaged by said carriage at a predetermined point whereby upon continued forward movement of the carriage beyond said point said means is actuated and the tool holder is automatically swung to effect movement of its tool into engagement with the work.

It is also an object of this invention to provide a lathe structure, as in the preceding paragraph, in which the carriage supports a separate tool arranged to engage another part of the work; the tool in said tool holder and said separate tool being disposed to simultaneously complete predetermined cuts.

An additional object of this arrangement is to provide in combination in a lathe which includes a longitudinally movable carriage, and a tool supporting turret mounted on said carriage; a tool holder pivotally mounted in connection with the bed of the lathe ahead of the carriage whereby to swing the tool to and from the work, a horizontally disposed bellcrank pivoted in connection with the bed of the lathe in generally transverse alinement with said tool holder, and a pull rod connected between one leg of said bellcrank and said tool holder; the bellcrank being disposed so that upon forward movement of the carriage to a predetermined point said carriage engages the other leg of the bellcrank, and upon continued forward movement of said carriage the bellcrank is rotated in a direction to cause the pull rod to swing said tool holder in a work engaging direction.

A further object of the invention is to produce a simple and inexpensive device and yet one which will be exceedingly effective for the purpose for which is is designed.

These objects I accomplish by means of such structure and relative arrangement of parts as will fully appear from a perusal of the following specification and claims.

In the drawings similar characters of reference indicate corresponding parts in the several views:

Figure 4 is a fragmentary elevation showing a modified form of stop-screw engaging means.

Figure 1:
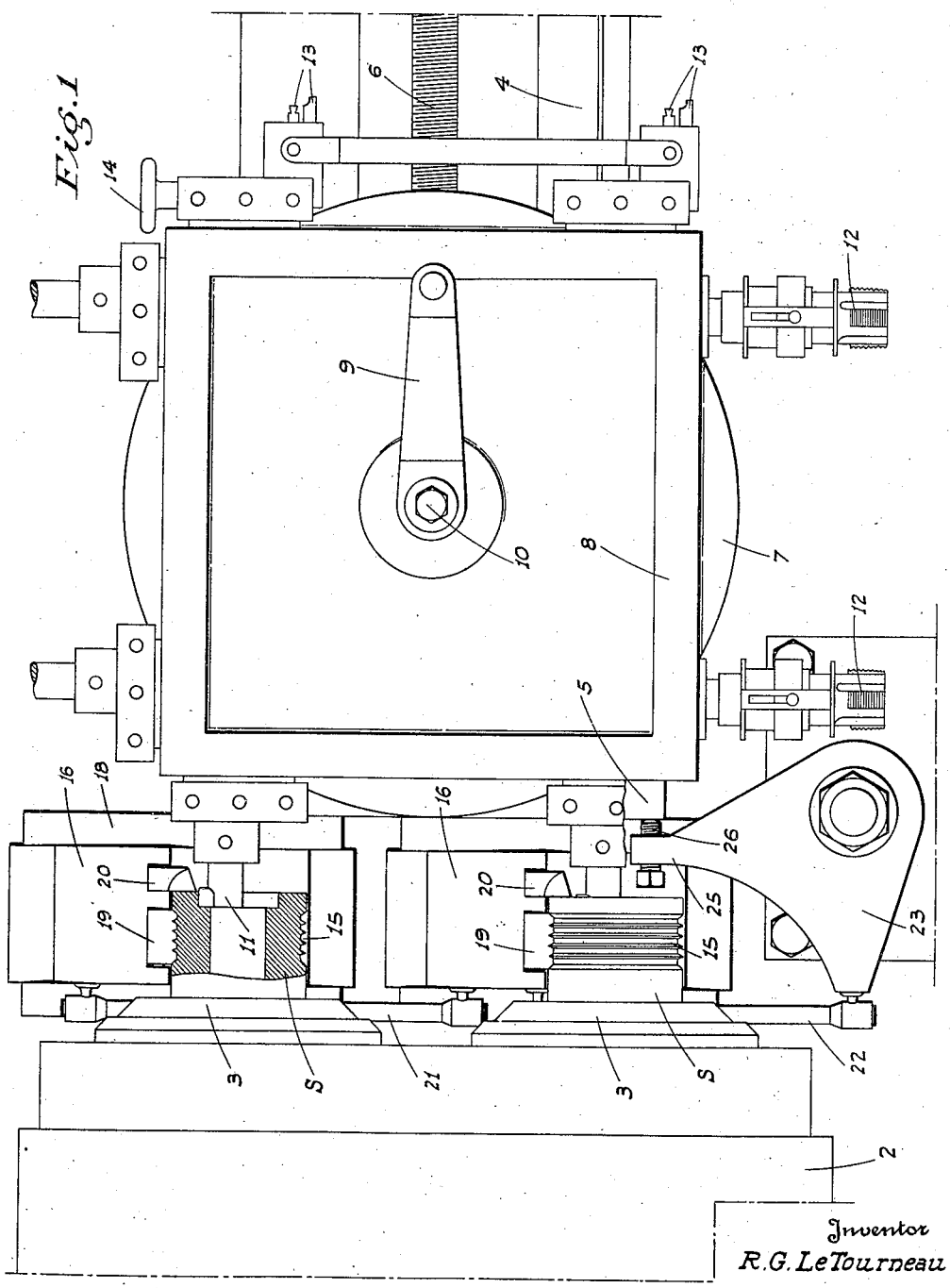
Figure 1 is a fragmentary plan view of a lathe embodying the improved tool mounting and actuating mechanism assembly.
Figure 2:
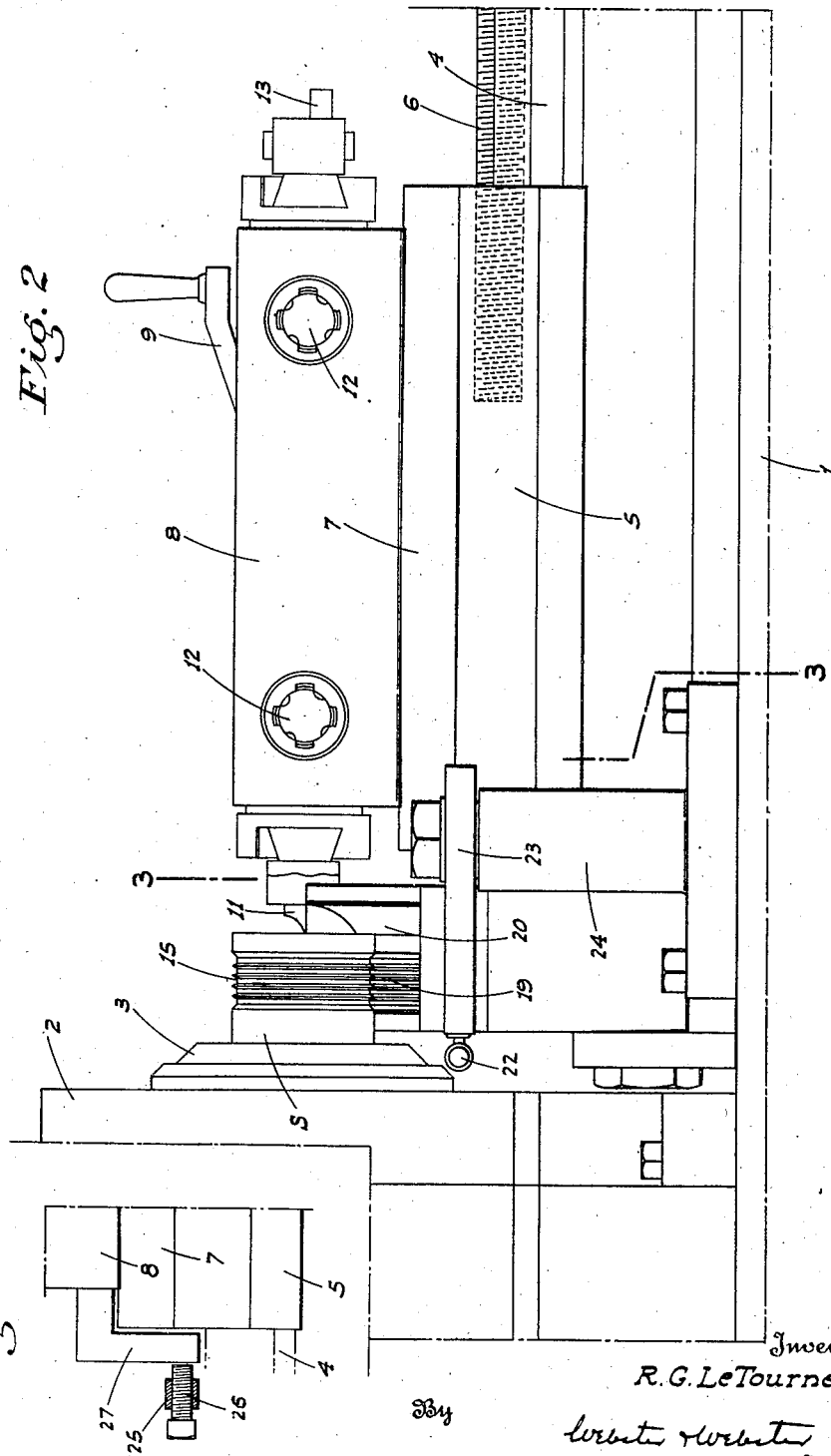
Figure 2 is a fragmentary side elevation of a lathe embodying the invention.
Figure 3:
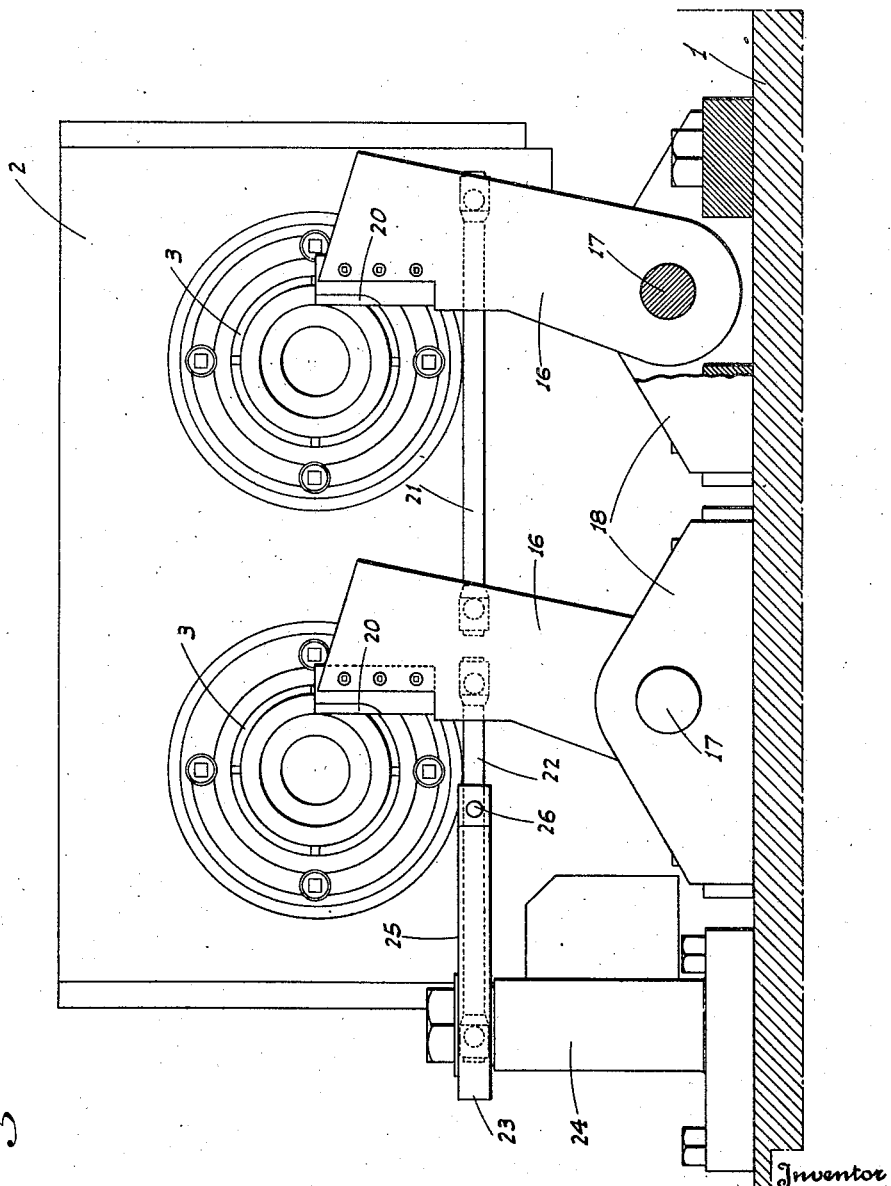
Figure 3 is an enlarged cross section on line 3—3 of Fig. 2.

Referring now more particularly to the characters of reference on the drawings, the lathe upon which the tool mounting and actuating mechanism assembly is mounted includes a bed 1 on one end of which is mounted a headstock, indicated generally at 2; said headstock including, in the present embodiment, a pair of transversely spaced, horizontally alined work-engaging driving chucks 3. These rotary chucks support the work with one end portion thereof exposed; the work here being shown as ordnance shells S which are engaged nose foremost in the chucks and with the butt end portion of the shells exposed for machining operations.

The bed 1 of the lathe includes longitudinal ways 4 on which a carriage 5 is mounted for horizontal sliding movement; such movement of the carriage being accomplished through the medium of a motor driven, operator controlled feed screw 6.

A turntable 7 is mounted on top of the carriage and supports a square or four-sided turret 8. The turntable 7 and turret 8 are secured together, and are normally located and held against rotation relative to the carriage 5 by suitable means which includes a hand crank 9 which is fixed on a locking screw, the upper end of the latter being shown at 10.

Pairs of tools for performing machining operations on the shells S are mounted in connection with and project outwardly from the sides of the turret 8; each pair of tools being adapted to accomplish a different cutting operation. For example, the tools 11 finish a counter-bore in the end of the shells S and face an inner shoulder; the tools 12, which are automatic collapsing taps, tap the bore in the work; and the tools 13 cut the radius and caulking groove in the butt end of the shell S; the tools 13 being arranged as shown for simultaneous manipulation from a hand wheel 14.

When the lathe is in operation the pairs of tools on the turret are consecutively brought into working position by manipulation of the turret 8, and each pair, when in working position, is advanced into engagement of the work and then retracted therefrom by suitable control of feed screw 6.

The above is conventional lathe practice.

The tool mounting and actuating mechanism assembly of the present invention comprises the following:

In the manufacture of ordnance shells it is necessary to machine a band seat 15 about the shell adjacent its butt end and, while adaptable and intended for other uses, the present assembly is especially designed for cutting such band seats in the exposed portion of shells S and facing the adjacent end thereof.

A pair of rigid tool holders 16 are disposed in slightly laterally offset relation to the vertical axis of corresponding ones of the chucks 3, and said holders are pivoted at their lower ends as at 17 between pairs of upstanding ears 18 fixed on the bed 1 of the lathe. The pivotal axis is parallel to the lathe axis and said tool holders are thus mounted for swinging movement transversely of the lathe. Normally said tool holders extend upward at an angle to the perpendicular and in clearance relation to the shells S; the upper ends of said tool holders terminating in a horizontal plane substantially at or slightly below the horizontal plane of the axis of the chucks 3.

On the side adjacent the shells S the holders 16 carry tools or cutters 19 shaped and positioned to cut the band seat 15 in the shells, in the shape shown, upon predetermined lateral swinging movement of said tool holders. The tool holders also support other tools 20 formed as positioned to simultaneously face the end of the shells S as tools 19 cut the band seats.

The tool holders 16 are connected in unitary relation by a horizontal tie rod 21 which is pivotally or universally connected at its ends to said holders. A pull rod 22 is universally connected at one end to one of said holders 16 and extends substantially horizontally therefrom in a direction away from the other one of said holders. The pull rod 22 is substantially horizontal and at its other end is universally connected with the outer end of one leg of a horizontal bellcrank plate 23 pivotally mounted for horizontal rotation on the upper end of an upstanding supporting post 24 mounted on the bed 1 in generally transverse alinement with the holders 16. The other leg 25 of the bellcrank plate projects horizontally inwardly and terminates at its inner end at a point directly in the path of movement of the forward end of carriage 5. An adjustment screw 26 is threaded through the leg 25 of the bellcrank plate lengthwise of the lathe whereby it is possible to adjust or vary the exact point at which the carriage will engage said screw and begin to effect rotative movement of the bellcrank plate.

*Operation*

After the carriage 5, and consequently the turret 8 and the working tools thereon have advanced a predetermined distance from starting position, the forward end of the carriage engages a screw 26 and with continued forward movement of said carriage the bellcrank plate 23 is rotated in a direction to impart an outward pull on rod 22. When this occurs the tool holders 16 are swung laterally in the direction which moves the tools 19 and 20 into work engagement. The screw 26 is adjusted so that the tools 19 and 20 complete their cut at the same time that the then working turret tools, here shown as tools 11, complete their cut.

It is thus apparent that the operator need only give attention to the proper control of the carriage to accomplish the cut which the working tools of the turret are intended to accomplish, as the described mechanism is operative to automatically actuate the tool holders 16. When the cuts are complete the carriage is retracted and as the screw 26 escapes from the forward end thereof the tool holders 16 fall away from the shells S by gravity.

In order that the tool holders 16 be actuated only when one certain pair of the turret mounted tools are brought into working position, the bellcrank plate 23 is formed and disposed so that the screw 26 will be engaged only by the turret operation which necessitates the farthest advance of the carriage toward the work. In other words, when any one of the other three pairs of tools are brought into play, the extent of advancing movement of the carriage to complete the corresponding cut on the shell is not sufficient to bring said carriage into bellcrank plate actuating position.

However, if it is desired to automatically stop the carriage at exactly the same point each time, regardless of which of the turret tools is being in use at the moment, a stop block 27, as shown in Fig. 4, may be added to the revolving square turret 8 on one side adjacent one corner so that when that side is pointed forward the stop block will project forward enough to engage screw 26, yet when the other three sides of the turret are pointing forward no such engagement will take place.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A lathe tool mounting and actuating mechanism assembly for a lathe which includes a headstock having a pair of horizontally spaced rotary chucks, and a longitudinally movable tool carriage spaced from the headstock; a pair of upstanding tool holders disposed in spaced relation transversely of the lathe between the carriage and headstock, means pivoting said tool holders at their lower ends on the lathe for swinging movement transversely thereof to and from corresponding work in said chucks, and means actuated by the carriage upon predetermined advance of the latter operative to simultaneously swing said tool holders to the work.

2. A lathe tool mounting and actuating mechanism assembly for a lathe which includes a headstock having a pair of horizontally spaced rotary chucks, and a longitudinally movable tool carriage spaced from the headstock; a pair of upstanding tool holders disposed in spaced relation transversely of the lathe between the carriage and headstock, means pivoting said tool holders at their lower ends on the lathe for swinging movement transversely thereof to and from corresponding work in said chucks, a tie rod connecting said tool holders for simultaneous swinging movement, and means actuated by the carriage upon predetermined advance of the latter operative to effect such simultaneous movement of the holders to the work.

3. A lathe tool mounting and actuating mechanism assembly for a lathe which includes a headstock having a pair of horizontally spaced rotary chucks, and a longitudinally movable tool carriage spaced from the headstock; a pair of upstanding tool holders disposed in spaced relation transversely of the lathe between the carriage and headstock, means pivoting said tool holders at their lower ends on the lathe for swinging movement transversely thereof to and from corresponding work in said chucks, a tie rod connecting said tool holders for simultaneous swinging movement, and means responsive to predetermined advance of the carriage operative to effect such simultaneous movement of the holders to the work, said means comprising a bellcrank with one leg disposed in the path of advancing movement of the carriage, and a pull rod connected between the other leg of the bellcrank and one of said tool holders.

4. A lathe tool mounting and actuating assembly for a lathe which includes a headstock having a rotary work supporting chuck, a carriage movable lengthwise of the lathe, and a plural-sided tool holding turret mounted on said carriage; said assembly comprising a separate tool holder, means mounting said tool holder on the lathe for movement to and from the work, means including an element engaged by said carriage at a predetermined point in the advance thereof, responsive to continued advance of the carriage and operative to move said tool holder to the work, and a plurality of separate tools projecting from the sides of the turret for alternate engagement with said work and arranged so that one only of said tools requires an advance of the turret to and beyond said point.

5. In a lathe, the combination of a bed, a tool carriage movable longitudinally thereof, a separate tool holder pivoted on the bed for swinging movement toward and away from the longitudinal axis of the tool carriage and so weighted as to normally drop away therefrom by gravity, and means actuated by the forward movement of the tool carriage to swing the tool holder toward such axis, such means comprising a bell crank, such bell crank when in normal inactive position having one leg disposed in the path of the advancing movement of the carriage, a pull rod connected between the other leg of the bell crank and the tool holder, the action of the crank when engaged by the carriage functioning to pull on the rod and carry the holder toward such axis, and the action of the tool holder when falling away from such axis functioning to cause the push rod to return the crank to its original position when released from engagement with the carriage.

ROBERT G. LE TOURNEAU.